Patented Mar. 6, 1945

2,371,088

UNITED STATES PATENT OFFICE 2,371,088

CATALYTIC DEHYDROGENATION PROCESS

Glenn M. Webb and Marvin A. Smith, Riverside, Ill., assignors to Universal Oil Products Company, Chicago, Ill., a corporation of Delaware No Drawing. Application April 30, 1943, Serial No. 485,138

7 Claims. (Cl. 260—668)

This application is a continuation-in-part of our co-pending application Serial No. 436,506 which was filed March 27, 1942.

This invention relates to a process for the dehydrogenation of organic compounds including hydrocarbons. More specifically, it is concerned with a process for dehydrogenating organic compounds by means of a highly active specially prepared alumina-containing catalyst.

The catalytic dehydrogenation of organic compounds, particularly of hydrocarbons, has developed into an extensive art that includes reforming of straight run gasolines; dehydrogenation of aliphatic hydrocarbons; aromatization of hydrocarbons containing 6 or more carbon atoms in a straight chain arrangement, or 6 carbon atoms in a cyclic arrangement, dehydrogenation of alkyl groups attached to aromatic nuclei; and the like.

In such processes, a wide variety of catalysts have been used, some of which have shown a high initial activity but none of which have been entirely satisfactory as far as catalyst life is concerned. For this reason, the quest for new catalysts and for new methods of preparation of catalysts which will result in the formation of catalytic masses having not only a high initial activity but also a high thermal stability and a resultant long life has been continuous. Generally speaking, catalysts containing alumina have been found to be the more satisfactory.

We have found that in performing dehydrogenation reactions, composites comprising alumina and compounds of molybdenum or catalysts comprising alumina, magnesia and compounds of molybdenum prepared in a particular manner hereinafter described are generally superior to other conventionally prepared alumina-containing dehydrogenation catalysts or other types of dehydrogenation catalysts that have been heretofore known in the art. Moreover, the manufacture of our catalyst is simple and economically practical.

In general, dehydrogenation reactions of organic compounds in accordance with the present invention are effected with the aid of catalysts prepared by forming a solution containing an aluminum salt and a molybdenum compound constituting the source of the catalytically active molybdenum compound to be associated with the alumina in the final catalyst, or by forming a solution containing an aluminum salt, a magnesium compound constituting the source of the magnesia in the final catalyst and a molybdenum compound constituting the source of the catalytically active molybdenum compound in the final catalyst, converting at least a portion of the aluminum salt into hydrated aluminum oxide under conditions such that the molybdenum compound or molybdenum and magnesium compounds are maintained in the soluble form in solution, evaporating solvent from the mixture and heating the residue under conditions such that volatilizable impurities are substantially removed.

In one embodiment, the present invention comprises contacting a dehydrogenatable organic compound under dehydrogenation conditions with a catalytic composite comprising an association of alumina and molybdena, said composite being prepared by forming a solution containing an aluminum salt and a compound constituting the source of molybdena, converting at least a major portion of the aluminum salt into hydrated aluminum oxide under conditions such that said molybdenum compound is maintained in soluble form, evaporating solvent from the mixture and heating the residue under conditions such that volatile impurities are substantially removed and the catalytic properties of the composite are developed and thereafter recovering the products of dehydrogenation.

In a further embodiment, the present invention comprises contacting a dehydrogenatable organic compound under dehydrogenating conditions with a catalytic composite comprising an association of alumina, magnesia and molybdena, said composite being prepared by forming a solution containing an aluminum salt, a magnesium compound constituting the source of magnesia and a compound constituting the source of the molybdena, converting at least a major portion of the aluminum salt into hydrated aluminum oxide under conditions such that the magnesium compound and molybdenum compound are maintained in soluble form, evaporating solvent from the mixture and heating the residue under conditions such that the volatile impurities are substantially removed and the catalytic properties of the composite are developed and thereafter recovering the products of dehydrogenation.

The molybdenum catalysts heretofore employed for dehydrogenation have been prepared by a variety of methods. For example, impregnation of prepared granular alumina with solutions of molybdenum compounds yielding catalytically active molybdenum oxides formed by chemical or thermal decomposition of the added compound to form the final composite is a standard method of preparation.

In contradistinction to the catalysts resulting from these known methods, the catalyst employed according to the invention is distinguished by an improved structure resulting from the manner of its manufacture. Thus an important advantage lies in the fact that our novel catalysts are characterized by a more even distribution of the molybdenum compounds throughout the body of the composite so that the catalytic surfaces are more uniform than in the case of the more conventional types of catalysts.

The advantages derived from the improved structure are apparent not only by the substantially higher initial catalytic activity of our catalyst but also by the larger period during which the catalyst retains its activity. This is clearly shown by the comparative examples presented hereinafter in this specification. These examples also show that a further improvement in catalyst life is obtained by the incorporation of magnesium oxide in the final catalyst without destroying the selectivity of the catalyst for dehydrogenating reactions.

In general, the present process possesses the following advantages over heretofore known processes of similar import:

1. Higher ultimate conversion to the desired product at a given set of operating conditions.
2. Higher conversion per pass, which will result in a lower recycle ratio of unconverted material when a recycle operation is employed.
3. Higher ultimate recovery of desirable dehydrogenation products resulting from decreased undesirable side reactions.
4. Lower carbon formation reducing the requirements for facilities of regeneration.
5. Higher conversion capacity for a plant of given catalyst capacity.
6. Improved quality of the reaction product in many cases.

It is apparent from the above advantages that our process constitutes a meritorious contribution in the art of dehydrogenation, extending from the initial cost of installing the plant through the operating costs and to the quality of the products produced.

In the manufacture of the catalyst employed in the present process, the hydrated aluminum oxide is precipitated from a solution of an aluminum salt of a volatilizable acid. Such salts may include salts of hydrochloric acid, hydrobromic acid, hydrofluoric acid, sulfuric acid, carbonic acid, nitric acid, acetic acid, oxalic acid and other acids which yield soluble aluminum salts. Aqueous solutions of aluminum salts are generally preferable. It is comprised within the scope of the catalyst manufacture to employ solutions of aluminum salts in other types of solvents which are substantially inert or non-reactive with aluminum salts or other ingredients to be used in the preparation of the catalyst composites as described hereinafter. By inert or non-reactive, it is meant that the solvent shall not cause transformation of the ingredients into an undesirable form, or shall not bring about an undesirable precipitation of the molybdenum compound. Mixtures of aqueous and non-aqueous solvents may be used in certain instances where the non-alumina substance is not sufficiently soluble in water.

The volatilizable basic precipitants used in the catalyst preparation include generally ammonium compounds having a basic reaction such as, for example, ammonium hydroxide, ammonium carbonate, etc.; also substituted ammonium compounds such as amines or nitrogen bases generally insofar as the compounds formed between these substances and the volatilizable acids in association with aluminum are sufficiently volatilizable and leave no undesirable residues upon subsequent decomposition or volatilization. It is preferable that the salt formed between the volatilizable basic precipitant and the acid radical be soluble in the solvent employed so that the only material not in solution is the alumina hydrogel or hydrosol.

The hydrated aluminum oxide may be precipitated by a volatilizable basic precipitant in a solution of a molybdenum compound yielding a catalytically active oxide or other substance on subsequent evaporation of the solvent without substantial precipitation of this molybdenum compound during the precipitation of the hydrated aluminum oxide.

Ordinarily in the catalyst manufacture, it is necessary to add a sufficient quantity of the precipitant to bring the pH to a value of at least about 4 to effect precipitation of a major portion of the hydrated alumina. In order to effect substantially complete precipitation of the hydrated alumina, it may be necessary to go to higher pH values even to the point of having the solution decidedly basic. The exact pH chosen in the preparation of any particular catalyst will depend on the concentration of the aluminum salt solution and upon the characteristics of the molybdenum or molybdenum and magnesium compounds present at this stage of the catalyst preparation. The particular pH chosen in the manufacture of the catalyst will be such that a major portion of the hydrated alumina is precipitated without substantial precipitation of the molybdenum and magnesium compounds.

In certain cases, it may be desirable to precipitate the alumina substantially completely by carrying the pH over to the basic and thereafter bringing the pH back to the acid side possibly to the extent of forming a hydrosol by the addition of a prepared acid, for example, acetic acid or hydrochloric acid. Such a procedure may be used especially when the compound constituting the source of the catalytic molybdenum compound is soluble in either basic or acetic solution. Thus, for example, one may make a solution of aluminum chloride and ammonium molybdate. A sufficient quantity of ammonium hydroxide may be added to bring the pH to about 8, thereby completely precipitating the alumina as hydrated aluminum oxide. If the original solutions are sufficiently dilute, the hydrated aluminum oxide may at this point be in highly dispersed form and the mixture may be evaporated and calcined. However, if a comparatively concentrated solution of the aluminum salt is used originally, the hydrated alumina may coagulate and form a more or less rigid gel or particles of gel which tend to separate upon standing. Although the ammonium molybdate is still in soluble form, the final mixture upon evaporation may not be uniform. To overcome the tendency towards non-uniformity, acetic acid, for example, may be added until the pH is on the acid side and part of the alumina is converted into a hydrosol whereby upon subsequent evaporation a uniform composite results. In the succeeding step of the catalyst manufacture, the suspension of hydrated aluminum oxide in the solution containing a molybdenum compound or a molybdenum and magnesium compound (as well as salts of a basic precipitant and the acid radical of the aluminum salt) is heated to drive off water (or other solvent if one is used), and leave a residual relatively dry, solid material.

In the next step the residual mass is heated at higher temperatures generally not exceeding 900° C. to remove by volatilization or decomposition the reaction products resulting from the precipitation of hydrated aluminum oxide; to drive off the remaining free water and at least a part of the bound water; and to develop the catalytic properties of the composite. This may involve, in part, decomposition of the molybdenum or molybdenum and magnesium compounds present into the oxides or other substances which are to be present in the final catalyst composite. When ammonium compounds have been used as the precipitants for the hydrated alumina in the primary stage of the catalyst preparation, the materials volatilized will be ammonium salts. For example, if ammonium hydroxide has been added to a solution of aluminum chloride the principal material volatilized in the final heating stage will be ammonium chloride. If volatile organic acids such as acetic acid have been present, or aluminum acetate were used in the preparation, some carbon may be present in the dry, solid mass due to decomposition of the organic material. In such a case, it is desirable to carry out the final heating step in the presence of an oxygen-containing gas to burn out the carbon.

Ordinarily, calcination temperatures below approximately 900° C. are employed in the final heating step. The exact temperature and time of heating used for any given catalyst preparation is dependent to a large extent upon the volatilization temperature of the salt of the basic precipitant; the use to which the catalyst is to be put; and upon other factors such as the decomposition temperature of the molybdenum or molybdenum and magnesium compounds to yield the associated catalytic molybdenum compound and magnesium oxide or substances. In many of these preparations, care must be taken to avoid overheating of the composite. Thus, when preparing catalysts for the dehydrogenation of dehydrogenatable organic compounds, temperatures in excess of about 900° C. should be avoided, and if the heating is carried out at such a temperature, the time of heating should be limited so that substantially no loss in catalytic activity occurs due to overheating. The correlation of time and temperature is always an important consideration in calcining catalysts, particularly when temperatures of the order of 700° C. or higher are used. It is a feature of any of the catalysts used in the process of the present invention that they withstand higher temperatures for longer times than catalysts of similar composition prepared by hitherto known methods. It is an advantage of the process that there is less likelihood of ruining the catalyst because of inadvertent over-heating. In general, heating conditions which result in the transformation of alumina to the alpha alumina form are to be avoided.

The final catalyst composite, after the calcination step, may be comminuted for use in powdered condition or it may be formed into various shapes by compression or extrusion methods. In forming pelleted catalyst from the catalytic material after the volatilization of the salts in the final step of preparation, the solid residue may be ground to a desired size and a small percentage of lubricating material such as rosin or fatty substances may be added to facilitate pilling in standard type of machines. Usually such pellets are later calcined at sufficiently elevated temperatures to remove the lubricant. In another type of forming process, finely divided catalytic material may be wetted and the particles formed by extrusion method with or without addition of lubricants or binders. As a further variation certain of the dried composites may be formed into shapes after drying, and the calcination step may then be carried out on the preformed particles.

The catalyst composites of the character heretofore described are particularly useful in the dehydrogenation of aliphatic hydrocarbons to produce aliphatic hydrocarbons containing a corresponding number of carbon atoms such as the dehydrogenation of butane to butylene and butadiene and the like. They may also be used for the dehydrogenation of naphthenes to produce aromatics. Likewise, these composites may be used to advantage for the cyclization of straight chain aliphatic hydrocarbons containing at least 6 carbon atoms.

In operating according to the process of this invention, the organic reactants which are to be dehydrogenated are usually heated to the desired conversion temperature and then contacted with the dehydrogenation catalyst. The catalyst may be either in the form of a powder or in the form of granules or shaped particles depending upon the type of operating procedure to be used. A convenient method of dehydrogenating the organic compounds is to pass the vaporous compounds at a conversion temperature through a stationary bed of catalyst particles at such a rate that the desired extent of conversion is effected. According to another method of operation, the powdered catalyst may be added to a flowing stream of the vaporous organic compounds and maintained in suspension in that stream for a sufficient length of time to dehydrogenate to the desired extent. In a modification of this last mentioned operation, a gaseous stream of vaporized charging material is bubbled upward through a turbulent bed of powdered dehydrogenating catalyst. In this modification, the flow of the charging material may be intermittent so that regeneration may be effected at intervals, or the catalyst may be continuously added to and withdrawn from the reaction zone and regenerated with an oxygen-containing gas in a separate zone. In the stationary bed operation previously mentioned, regeneration is usually accomplished intermittently.

The conditions of operation in the dehydrogenation step depend to a large extent upon the type of catalyst that is used, upon the material being dehydrogenated, upon the extent of dehydrogenation that is desired, and upon various other factors. Generally speaking, in the case of reforming gasoline fractions or naphthas in the presence of hydrogen, i. e. in so-called "hydroforming," temperatures in the range of from 450 to 700° C.; pressures in the range of from atmospheric to 40 atmospheres or more; liquid hourly space velocities usually below about 10 and preferably in the range of from 0.1 to 5; and molal ratios of hydrogen to charging material in the range of 0.2 to 8 are usually employed. In general, relatively high space velocities are used at relatively high temperatures within the ranges indicated, and at any given temperature a relatively high space velocity may be used with a relatively high pressure. In this process, any hydrogen-containing gas (oxygen free), preferably one predominantly hydrogen, may be employed. Since a net production of hydrogen results from the "hydroforming" process, a part of the process gases may be recycled.

By the term "liquid hourly space velocity" as herein used, we mean the volumes of hydrocarbon per hour measured as liquid at normal temperature, per bulk volume of granular catalyst.

The term "gas hourly space velocity" as used herein refers to the volumes of hydrocarbon per hour measured as a gas at standard conditions of temperature and pressure, per bulk volume of granular catalyst.

If the reaction is carried out in the presence of powdered catalyst moving through a reaction zone, the ratio of catalyst to hydrocarbon may be expressed in appropriate terms corresponding to the conditions expressed by these definitions.

In the case of catalytic reforming wherein hydrogen is not used the operating conditions may otherwise be substantially the same as in the "hydroforming" process.

In aromatizing a hydrocarbon consisting of or containing aliphatic hydrocarbons having 6 or more carbon atoms per molecule, the operating conditions may be as follows: temperatures in the approximate range of from 450–700° C.; pressures varying from atmospheric to 10 atmospheres or more, and liquid space velocities usually less than about 10 and preferably ranging from about 0.1 to 5.

In the dehydrogenation of naphthenes containing 6 carbon atoms in a ring, temperatures ranging from 250° C. to 650° C., liquid space velocities in the range of from about 0.1 to about 20, and pressures ranging from atmospheric to 10 atmospheres or higher may be used. Usually, the charging materials for aromatization processes are stocks which consist not only of straight chain aliphatic hydrocarbons but also of naphthenes containing 6 carbon atoms in a ring. For this reason, when operating on a charge containing both aliphatic hydrocarbons and naphthenes, conditions for the aromatization of the aliphatic hydrocarbons are employed, if it is desired to form aromatics from the aliphatics as well as from the naphthenes.

In dehydrogenating aliphatic hydrocarbons into corresponding less saturated aliphatic hydrocarbons such as dehydrogenating paraffins to form olefins; mono-olefins to form diolefins; and the like, the conditions which are employed will depend to a large extent upon the charging material. For example, in the dehydrogenation of butane to form butenes, temperatures ranging approximately 450 to 700° C.; gaseous space velocities ranging from 200 to 5000; and pressures ranging from subatmospheric to about 10 atmospheres are usually used.

In dehydrogenating butane or butene or butane-butene mixtures to butadiene, the temperatures may range from 450 to 700° C., the gas space velocities from 200–3000, and the pressure, atmospheric, but preferably substantially subatmospheric. The partial pressure of the $C_4$ hydrocarbons is usually kept below 300 mm. mercury absolute, preferably between 15 and 250 mm. mercury absolute, in order to prevent undue decomposition of the butadiene. The partial pressure of the hydrocarbon may be reduced by use of steam or other inert gases in some cases.

In the dehydrogenation of ethylbenzene to form styrene, the temperatures may range from 450–700° C., and the liquid space velocities from 0.1 to 5. Low pressures are preferred, ranging from 0.1 to 2 atmospheres. In this case the partial pressure of the ethylbenzene may be reduced by steam or other inert gases.

In general, when dehydrogenating organic compounds according to the present invention, temperatures and pressures to be employed may be of the order of those heretofore employed in like reactions.

The following are specific examples of the preparation of catalysts and their use in specific embodiments of the present process.

EXAMPLE I

Hydroforming of low octane number gasolines according to the invention using an alumina-molybdena composite as catalyst prepared in accordance with our preferred method is considered in comparison with the use of catalysts prepared by the conventional procedure of impregnating prepared granules of alumina with compounds yielding molybdenum oxides.

In the preparation of the presently preferred type of catalyst aluminum chloride hexahydrate is dissolved in water, one liter of water being used per gram mole of the compound $AlCl_3.6H_2O$. To such a solution an amount of ammonium molybdate is added so that in the finally prepared catalyst there is a weight percentage of molybdenum oxides calculated as $MoO_3$ equal to about 7 percent of the total composite. During thorough agitation of the solution varying amounts of ammonium hydroxide may be added to produce different pH values corresponding to the precipitation of substantially all of the dissolved aluminum salt as hydrated aluminum oxide. The suspension of hydrated aluminum oxide in the ammonium molybdate solution is then heated to drive off water and produce a residual solid mass which in each case is then heated to a temperature of about 370° C. to about 400° C., ground to pass a 30 mesh sieve, mixed with 4 percent by weight of rosin and formed into $\frac{1}{8}''$ by $\frac{1}{8}''$ pellets. To free the pellets of rosin and a major portion of the combined water, they are heated in the presence of air at about 600° C. for about two hours and then at about 750° C. for approximately 6 hours.

The catalyst thus prepared is compared with another catalyst manufactured in substantially identical manner except that no ammonium hydroxide is added during the preparation. The catalyst is further compared with one made by impregnating $\frac{1}{8}''$ by $\frac{1}{8}''$ pellets of an Activated Alumina of commerce with ammonium molybdate solution followed by drying and calcining under substantially the conditions used above. The concentration of molybdenum oxides in the calcined composite correspond to that of the other two catalysts. This catalyst is typical of those used in commercial hydroforming operations except that it is calcined at a higher temperature than is ordinarily used.

Experience has shown that the behavior of catalysts calcined at 750° C. for 6 hours and then tested for activity under the conditions shown is a qualitative evaluation of the ability of the catalysts to stand up under long periods of operation. No absolute correlation between the test and the life of the catalyst has been worked out, but experience has shown that the catalyst having the higher activity after such calcination is superior for commercial purposes.

Catalysts prepared in the manner described are tested for hydroforming activity in the treatment of a Mid-Continent naphtha fraction boiling from 103–207° C. and having an A. S. T. M. octane number of 35. The prepared catalyst pellets are placed in tubular reactors, and the vapors of the naphtha mixed with about 4.5 moles of hydrogen per average mole of naphtha are passed through the catalyst at a temperature of about 505° C. at a pressure of 7 atmospheres, and a liquid hourly space velocity of 0.5. The results are shown in Table I.

TABLE I

*Comparative data on alumina-molybdena catalysts in hydroforming*

|  | Run No. | | | | | |
|---|---|---|---|---|---|---|
|  | 1 | 2 | 3 | 4 | 5 | 6 |
| Precipitant | None | NH$_4$OH | NH$_4$OH | (NH$_4$)$_2$CO$_3$ | (NH$_4$)$_2$CO$_3$ | Impregnated catalyst |
| Final pH value | 1.8 | 4.9 | 8.5 | 5.0 | 7.8 | -- |
| Calcining temp., °C | 750 | 750 | 750 | 750 | 750 | 750 |
| Yield of gasoline, volume per cent | 82.0 | 71.4 | 63.6 | 69.6 | 68.0 | 90.0 |
| Octane No. of 10 pound R. V. P.[1] gasoline | 76.9 | 84.5 | 88.3 | 87.0 | 86.6 | 59.0 |
| Carbon, wt. per cent | 0.30 | 0.88 | 0.94 | 1.33 | 0.71 | 0.14 |

[1] Reid vapor pressure.

The catalysts made by the present process are more active than catalysts of the same chemical composition made by evaporating solutions of salts of the components and calcining the residue, or by the conventional impregnating process. This fact is evidenced by the higher octane numbers of the reformed gasoline.

The data established the superiority of the process of this invention.

To further establish the superiority of our preferred operation, our catalyst is compared with the impregnated catalyst calcined at 600° C. for 6 hours. Under these conditions, the maximum activity of the impregnated catalyst is developed. The results are shown in Table II.

TABLE II

|  | Run No. | |
|---|---|---|
|  | 8 | 9 |
|  | Catalyst | |
|  | Improved Al$_2$O$_3$-MoO$_3$ | Impregnated Al$_2$O$_3$-MoO$_3$ |
| Calcination temp., °C | 750 | 600 |
| Processing temp., °C | 500 | 500 |
| Liquid hourly space velocity | 1 | 0.5 |
| Yield gasoline, volume percent | 80.5 | 79.1 |
| Carbon, wt. percent | 0.44 | 0.76 |
| A. S. T. M. octane No. | 80.5 | 78.7 |

By our process it becomes possible to employ double the space velocity (half the contact time) and produce a higher yield of higher octane number gasoline. Moreover, less carbon is formed than is the case with the impregnated catalyst.

From these data it would appear that by operating according to the invention instead of with the conventional impregnated catalyst, a plant of given catalyst capacity would be doubled in reforming capacity while producing a better quality product. Actually this is not the only benefit realized. Because of lower carbon formation, the requirements for regeneration facilities in connection with the reforming plant are materially reduced; less of the charging stock is lost through carbon formation; less time is required for regeneration and conversely, more time is available for processing; fewer and less severe regenerations are required which is a factor favoring economy and longer catalyst life. In addition to the fact that the catalyst activity is maintained over longer periods of use, higher octane numbers may be obtained with our catalyst than is the case with catalysts produced by the impregnation method.

EXAMPLE II

Dehydrogenation of butane and butylene is carried out by the process. In order to operate at a reasonably low effective temperature and at a pressure not lower than is necessary and consistent with good conversion, a catalyst of high activity and low carbon-forming tendency is used. The aluminum molybdena catalyst prepared by the process of our invention is particularly suitable for this operation. These catalyst composites may be used as such or magnesium oxide may be added to form a catalyst comprising alumina, molybdena and magnesia. The relative portions of alumina and added oxide or oxides depend to some extent on the particular conditions of temperature and pressure employed. As a rule, the best results are obtained when the molybdena content of the composite catalyst is less than 10% by weight.

In Table III are shown comparative results employing impregnated catalysts and those preferred in the process of our invention.

The impregnated catalysts are made according to the general procedure of soaking activated alumina in a solution of a compound of molybdenum, drying and calcining. The particular impregnated catalyst used in the run herein reported is prepared by soaking activated alumina with ammonium molybdate solution.

The improved molybdenum-aluminum catalyst used in accordance with the invention is prepared as outlined in Example I. The results of dehydrogenating butane-butene mixture containing approximately 40% butene to produce butadiene is shown together with the operating conditions in Table III.

TABLE III

*Dehydrogenation of butane-butene mixture to butadiene*

|  | Catalyst | |
|---|---|---|
|  | Impregnated 92% Al$_2$O$_3$ 8% MoO$_3$ | Improved 92% Al$_2$O$_3$ 8% MoO$_3$ |
| Calcining temp., °C | 700 | 700 |
| Process temp., °C | 675 | 675 |
| Process pressure mm. Hg | 80 | 80 |
| Gas hourly space velocity | 1,300 | 1,300 |
| Process period, minutes | 30 | 30 |
| Yield of butadiene, wt. per cent: |  |  |
| Once through | 24 | 27 |
| Ultimate yield based on recycle | 68 | 86 |
| Carbon, wt. per cent | 1.96 | 1.32 |

The data show that there is a substantial improvement in the amount of butadiene produced both on the once-through and on a recycle basis when using the improved catalyst. Furthermore, less carbon is formed in the case of the improved catalyst than in the case of the impregnated catalyst. The advantages of such an operation are apparent both from the standpoint of conversion and plant cost.

The improved catalyst retains its activity for much longer time than in the case of the impregnated catalyst. At a point in which the impregnated catalyst dropped in activity so that the once-through yield of about 12% of butadiene is obtained, the operation with the improved catalyst produces more than 20% per pass.

EXAMPLE III

Paraffin hydrocarbons containing at least 6 carbon atoms may be converted in accordance with the invention into aromatics by treatment with catalysts of the character described.

Table IV illustrates comparative results when a normal heptane fraction obtained by distillation of a mineral oil is cyclized with the improved catalyst of our process and a catalyst produced by impregnation of activated alumina.

TABLE IV

*Cyclization of heptane*

|  | Catalyst | |
| --- | --- | --- |
|  | Impregnated 97% Al$_2$O$_3$— 3% MoO$_3$ | Improved 97% Al$_2$O$_3$— 3% MoO$_3$ |
| Calcining temp., °C | 600 | 700 |
| Processing conditions: |  |  |
| Temp., °C | 550 | 550 |
| Pressure, atm | 1 | 1 |
| Liquid hourly space velocity | 0.5 | 0.5 |
| Process period, hours | 4 | 4 |
| Yields, wt. per cent charge: |  |  |
| Liquid recovery | 78 | 72 |
| Aromatics [1] | 25 | 62 |
| Carbon | 3.05 | 1.5 |

[1] Largely toluene.

The results in the table show that the operation according to the invention is substantially superior as to yield of aromatic hydrocarbon. Furthermore, although the yield of aromatic hydrocarbons is substantially better when using the improved catalyst than with the use of impregnated catalyst, the actual amount of carbon formed is substantially less. Because of the relatively high temperature used in cyclization, it is desirable to use a catalyst having a good stability over extended periods of processing the regeneration, an advantage realized in the case of our improved catalyst.

EXAMPLE IV

Our invention may be applied to the dehydrogenation of paraffins to mono-olefins and particularly to the dehydrogenation of those paraffin hydrocarbons containing less than 6 carbon atoms to the molecule. Of these the dehydrogenation of butanes is the most important at this time.

While the final data are obtained with the processing periods of 45 minutes, the operation may in general be effected with processing periods of 0.5 to 10 hours and even longer. The treatment of the paraffin hydrocarbon is preferably effected in just sufficiently superatmospheric pressure to assure flow through the system without the use of vacuum pumps. The presence of steam during the processing is generally undesirable. The exact conditions chosen for any paraffin or mixture of paraffins will depend primarily upon the hydrocarbon undergoing conversion.

Results obtained in the treatment of normal butane are shown in the following Table V.

TABLE V

*Dehydrogenation of n-butane to butene*

|  | Catalyst | |
| --- | --- | --- |
|  | Impregnated 96% Al$_2$O$_3$— 4% MoO$_3$ | Improved 96% Al$_2$O$_3$— 4% MoO$_3$ |
| Processing conditions: |  |  |
| Temp., °C | 600 | 600 |
| Pressure, atm | 1.2 | 1.2 |
| Gas space velocity | 1,500 | 2,000 |
| Process period, minutes | 45 | 45 |
| Conversion, mol per cent butene per pass | 10.5 | 18 |

The data in Table V illustrate the attainment of a relatively higher yield of butene per pass with the improved catalyst relative to the corresponding impregnated catalyst in conjunction with a substantially higher permissible gas space velocity resulting in an increased butane dehydrogenation capacity for a plant of given catalyst capacity.

EXAMPLE V

A naphtha fraction obtained from a Mid-Continent straight run gasoline having a boiling range of from about 93° to about 205° C. and an octane number of about 36 was processed in the presence of about 4 moles of hydrogen per mole of hydrocarbon with the improved catalyst of our process and a catalyst produced by impregnation of active alumina. Table VI illustrates the comparative results obtained in these operations.

TABLE VI

|  | Improved Al$_2$O$_3$.MoO$_3$ | | | | | Impregnated Al$_2$O$_3$.MoO$_3$ | | | | | |
| --- | --- | --- | --- | --- | --- | --- | --- | --- | --- | --- | --- |
| Hours processed | 24 | 432 | 1,326 | 2,436 | 2,886 | 218 | 872 | 1,310 | 2,590 | 3,050 | 3,270 |
| Liquid product, wt. per cent | 67.1 | 66.5 | 68.9 | 67.3 | 67.9 | 80.5 | 81.0 | 82.6 | 83.7 | 83.6 | 83.0 |
| Octane No. liquid prod | 87.0 | 88.1 | 87.7 | 87.3 | 88.0 | 78.7 | 78.9 | 79.1 | 77.5 | 76.1 | 75.6 |
| Carbon, wt. per cent charge | 0.82 | 0.87 | 0.84 | 1.00 | 0.87 | 1.40 | 1.15 | 1.41 | 1.99 | 1.34 | 1.55 |
| Catalyst temp., °C | 519 | 523 | 522 | 523 | 523 | 500 | 500 | 500 | 500 | 500 | 500 |
| Space velocity | 0.59 | 0.59 | 0.60 | 0.59 | 0.60 | 0.5 | 0.5 | 0.5 | 0.5 | 0.5 | 0.5 |

The catalysts made by the present process are more active than the catalyst of the same chemical composition made by the conventional impregnation process. This is clearly evident from the data in Table VI which shows a substantially higher octane number product obtained when using the improved catalyst. It is also noted that this increased octane number is obtained with a substantially lower carbon deposition on the catalyst. A further advantage is evident in that the improved catalyst after about 2886 hours still maintains this initial activity while the impregnated catalyst had lost activity as evidenced by the drop in octane number of the product.

EXAMPLE VI

A heptane fraction obtained by the precise fractionation of a straight run gasoline having an A. P. I. gravity of 55.4 and a boiling range of about 220 to 270° F. was mixed with about 3.5 moles of hydrogen per mole of hydrocarbon and contacted under the same conditions of temperature and pressure with alumina, molybdena and magnesia catalyst prepared in accordance with the present invention and a catalyst having a similar composition prepared by impregnation. In order to more clearly show the stabilizing effect of the magnesia in a composite catalyst containing about 10% molybdena, the catalysts were calcined at temperatures of 750° to 800° C. before being employed in the hydroforming operation. The operating conditions and results obtained are presented below in Table VII.

TABLE VII

|  | Catalyst | | | |
| --- | --- | --- | --- | --- |
|  | Impregnated 10% molybdena 6% MgO 84% alumina | | Improved 10% molybdena 5% MgO 85% alumina | |
| Calcination temp., °C. for 6 hours | 750 | 800 | 750 | 800 |
| Processing conditions: | | | | |
| Temp., °C | 515 | 515 | 515 | 515 |
| Space velocity | 1.0 | 1.0 | 1.0 | 1.0 |
| Pressure A/sq. in. gauge | 100 | 100 | 100 | 100 |
| Yields, vol. per cent of chg.: | | | | |
| Liquid recovery | 88.2 | 87.5 | 89.2 | 89.5 |
| Toluene | 23.0 | 21.2 | 23.0 | 23.1 |

It is noted from the above data that the calcination of the impregnated catalyst at 800° C. had a marked effect on the activity of the catalyst. The toluene yield was decreased by 1.8%. On the other hand, calcination of our improved catalyst at 800° C. had no detrimental effect on the catalyst activity and, if anything, increased it slightly.

It is evident, therefore, that a catalyst prepared in accordance with this invention is more stable, thermally speaking, than a catalyst of similar composition prepared by the old impregnation method and because of its increased thermal stability, has a considerably longer effective catalyst life.

We claim as our invention:

1. A process for the dehydrogenation of organic materials which comprises contacting a dehydrogenatable organic material under dehydrogenating conditions with a catalyst composite comprising alumina, magnesia and a catalytically active molybdenum compound, said composite having been prepared by adding a precipitant for hydrated alumina to a solution of an aluminum salt, a magnesium compound constituting the source of the magnesia and a molybdenum compound constituting the source of the active molybdenum compound, said compounds being soluble in the solvent of said solution in the presence of hydrated alumina and the added precipitant, precipitating hydrated alumina from the solution under conditions regulated to maintain substantially all of said magnesium and molybdenum compounds soluble in said solvent, heating the precipitated alumina together with substantially all of said solvent and said compounds soluble therein sufficiently to evaporate the solvent and to leave a residual solid material comprising alumina and said compounds and heating said residual material to develop said magnesia and catalytically active molybdenum compound on the alumina.

2. A process for the dehydrogenation of hydrocarbons which comprises contacting a dehydrogenatable hydrocarbon under dehydrogenation conditions with a catalyst composite comprising alumina, magnesia and a catalytically active molybdenum compound, said composite having been prepared by adding a precipitant for hydrated alumina to a solution of an aluminum salt, a magnesium compound constituting the source of magnesia and a molybdenum compound constituting the source of said active molybdenum compound, said compounds being soluble in the solvent of said solution in the presence of hydrated alumina and the added precipitant, precipitating hydrated alumina from the solution under conditions regulated to maintain substantially all of said compounds soluble in said solvent, heating the precipitated alumina together with substantially all of said solvent and said compounds soluble therein sufficiently to evaporate the solvent and to leave a residual solid material comprising alumina and said compounds and heating said residual material to develop said magnesia and catalytically active molybdenum compound on the alumina.

3. A process for the dehydrogenation of organic materials which comprises contacting a dehydrogenatable organic material under dehydrogenating conditions with an alumina-molybdena-magnesia composite, said composite having been prepared by forming a solution of an aluminum salt, a magnesium salt and ammonium molybdate, precipitating hydrated alumina from said solution under conditions such as to maintain the magnesium salt and ammonium molybdate soluble in the solvent of said solution, heating the solution of ammonium molybdate and magnesium salt containing the precipitated alumina sufficiently to evaporate the solvent and to leave a residual solid material comprising alumina, magnesia and ammonium molybdate and heating said residual material sufficiently to convert the ammonium molybdate to molybdenum oxide.

4. A process for the dehydrogenation of organic materials which comprises contacting a dehydrogenatable organic material under dehydrogenating conditions with a catalyst composite comprising alumina, magnesia and a catalytic oxide of molybdenum, said composite having been prepared by adding a volatile basic precipitant to a solution of an aluminum salt of a volatilizable acid, a magnesium compound constituting the source of magnesia and a molybdenum compound which is convertible to said catalytic oxide on heating thereof, said magnesium and molybdenum compounds being soluble in the solvent of said solution in the presence of hydrated alumina and the added precipitant, precipitating hydrated alumina from the solution under conditions regulated to maintain substantially all of said magnesium and molybdenum compounds soluble in said solvent, heating the precipitated alumina together with substantially all of said solvent containing said magnesium and molybdenum compounds soluble therein sufficiently to evaporate the solvent and to leave a residual solid material comprising alumina and said magnesium and molybdenum compounds and heating said residual material sufficiently to expel volatiles therefrom and to convert said magnesium compound to magnesia and said molybdenum compound to a catalytically active molybdenum oxide.

5. The process as defined in claim 1 further characterized in that said dehydrogenatable organic material comprises a hydrocarbon fraction boiling in the gasoline range and said dehydrogenating conditions are such as to reform said gasoline fraction to improve its antiknock value.

6. The process as defined in claim 3 further characterized in that said dehydrogenatable organic material comprises a hydrocarbon fraction boiling in the gasoline range and said dehydrogenating conditions are such as to reform said gasoline fraction to improve its antiknock value.

7. The process as defined in claim 4 further characterized in that said dehydrogenatable organic material comprises a hydrocarbon fraction boiling in the gasoline range and said dehydrogenating conditions are such as to reform said gasoline fraction to improve its antiknock value.

GLENN M. WEBB.
MARVIN A. SMITH.